United States Patent [19]
Duff

[11] 3,873,327
[45] Mar. 25, 1975

[54] DENTAL CEMENT AND FILLING MATERIAL

[76] Inventor: Edward John Duff, Watch Lane Farm, Moston, Sandbach, Chesire, England

[22] Filed: Feb. 28, 1974

[21] Appl. No.: 446,612

[30] Foreign Application Priority Data
Mar. 6, 1973 United Kingdom............... 10938/73

[52] U.S. Cl.................. 106/35, 106/85, 260/998.11
[51] Int. Cl............................................... C09k 3/00
[58] Field of Search ................. 106/35, 731, 63, 85; 260/998.11

[56] References Cited
UNITED STATES PATENTS
2,413,159  12/1946  Weyl..................................... 106/63
3,510,322  5/1970  Higashi................................. 106/35

OTHER PUBLICATIONS

Chem. Abst., 74: 130,406g, 1971.

*Primary Examiner*—Theodore Morris
*Attorney, Agent, or Firm*—Robert L. Stone; Murray M. Grill; Herbert S. Sylvester

[57] ABSTRACT

A composition useful in the preparation of dental cements and dental fillings containing zinc oxide and calcium fluro phosphate e.g., fluroapatite. A binder can be added to the zinc oxide and fluroapatite or derative thereof to produce a dental cement.

3 Claims, No Drawings

DENTAL CEMENT AND FILLING MATERIAL

This invention relates to dental materials, in particular dental cement for lining cavities and dental filling material for filling cavities.

A conventional type of such a material comprises zinc oxide which is mixed with orthophosphoric acid or a polyacrylic acid of suitable molecular weight. The mixture is prepared in the form of a paste of suitable viscosity for the intended purpose (lining or filling). The paste sets in the cavity. There is usually some excess of the acid in the mixture which does no harm and is believed to improve adhesion of the dental material to the underlying tooth structure.

According to the present invention a dental material includes substances conducive to remineralisation of the underlying tooth structure.

In accordance with the invention there is included in the dental material a fluorine-containing compound which will dissolve or dissociate or decompose to yield fluoride ions. Suitable soluble fluorine-containing compounds include alkali metal fluorides such as sodium fluoride, ammonium fluoride, other metal fluorides such as stannous fluoride and zinc fluoride, and fluroide salts of organic bases. Examples of compounds which contain fluorine and may release fluoride ions on decomposition include soluble monofluorophosphates and difluorophosphates of alkali metals such as sodium, ammonium, and certain other cations. Examples of insoluble compounds are monofluorophosphates and difluorophosphates of catiohs such as calcium. The term "insoluble" as used herein means sparingly soluble as compared to what are normally regarded as soluble materials.

With such a dental material, containing a substance which can release fluoride ions, it is believed that there is some migration of fluoride ions from the dental material into the underlying tooth structure, with consequent increase in the resistance of the underlying tooth structure to further decay.

Mixtures of fluorine-containing materials may be used, and may in some cases be advantageous. For example, a dental material containing sodium monofluorophosphate as the sole fluoride-yielding additive may be found to set too fast, whereas with sodium fluoride as the sole fluoride-yielding additive the material may set too slowly. By adding both sodium monofluorophosphate and sodium fluoride in varying proportions the setting time can be suitably adjusted. The total amount of fluorine-containing materials is typically about 0.5–29 percent by weight of the cement or filling powder, preferably about 2–15 percent and most preferably about 2–10 percent.

The dental cement or filling material also includes a calcium orthophosphate material as described below.

The calcium orthophosphate material is selected from:

1. analytically pure fluorapatite (FA):
2. FA having the crystal morphology of Brushite;
3. FA having the crystal morphology of Monetite;
4. Hydroxyapatite (HA) having monofluorophosphate ions incorporated in the crystal lattice thereof;
5. HA having carbonate or bicarbonate ions incorporated in the crystal lattice thereof;
6. HA having a complex fluoro anion of a transition metal incorporated in the crystal lattice thereof;
7. Fluorohydroxyapatite (FHA);
8. FA wherein a portion of the calcium ion thereof is replaced by another divalent cation;
9. FHA wherein a portion of the calcium ion content thereof is replaced by another divalent cation;
10. HA wherein a portion of the calcium ion content thereof is replaced by another divalent cation;
11. DCPD wherein a portion of the calcium ion content thereof is replaced by another divalent cation;
12. ADCP wherein a portion of the calcium ion content is replaced by another divalent cation.

The said transition metal (item 6) and divalent cations (items 8 to 12) should be inherently non-toxic or else used sparingly in non-toxic amounts.

ANALYTICALLY PURE FA

An analytically pure FA can be formed by reaction of dicalcium orthophosphate dihydrate (DCPD, $DCP.2H_2O$ or $CaHPO_4.2H_2O$), mineralogically known as Brushite, with an aqueous solution of hydrogen fluoride or of ammonium fluoride. The crystal morphology of Brushite is usually of lamella shaped, plate-like, monoclinic crystals. The term "analytically pure" connotes that cations from any of the components of the reactant system are not introducd into the lattice of the FA reaction product, such as would occur, for instance, if an alkali metal fluoride were employed in the solution reaction. The reaction typically proceeds in the presence of an organic base or ammonia for buffering purposes particularly if hydrofluoric acid reactant is employed. Triethanolamine is the preferred organic base. The pH at the start of the reaction is desirably between about 5 and about 8, since at lower pH values some calcium fluoride may form and at higher pH values some HA may form. A preferred pH range is from about 5.5 to about 7, most preferably 6.5. Fluoride ions diffuse into the DCPD and induces a solid state transformation reaction which forms the FA and is accompanied by a drop in pH of the supernatant liquor. The reaction proceeds easily at from room temperature for about 7 days to about 100°C for about 2 days. Preferably, the reaction is conducted at about 90°C for at least 2 days. The fluoride reactant is employed in amount of fluoride anion ranging from stoichiometric to about 1.1 times the stoichiometric amount of DCPD. Greater relative amounts of fluoride promote the formation of calcium fluoride which would be analytically pure if the stoichiometric excess were to be 2.5 times and if a suitable initial pH were chosen. The preferred amount of fluoride for the formation of analytically pure FA is about 1.05 times the stoichiometric amount.

FA HAVING BRUSHITE OR MONETITE CRYSTAL MORPHOLOGY

Calcium orthophosphate materials having the morphology and characteristics of Brushite or Monetite may also be used in the cement or filling material. This is accomplished by preparing FA from DCPD or ADCP or selected amounts in mixtures of these materials, typically ranging from ratios of DCPD to ADCP of from about 10:1 to about 1:10, preferably about 10:1 to about 1:1.

The reaction is carried out by reacting the calcium orthophosphate salt (DCPD, ADCP or mixtures thereof) with an alkali metal fluoride, such as sodium fluoride or potassium fluoride, and preferably sodium fluoride, in a mole ratio of the calcium orthophosphate salt (not including water of crystallisation) to fluoride anion of from about 5:1 to about 1:1, preferably about 5:1. The reaction proceeds easily to completion in aqueous solution at from room temperature to about 100°C, preferably about 90°C. An organic base such as triethanolamine may be employed to control the pH near neutrality. It is desirable to carry out the reaction in a compatible, inert plastic vessel, such as one made of polyethylene.

The FA reaction product has the crystal morphology of Brushite and/or Monetite, as the case may be.

In the foregoing procedures wherein the Brushite and/or Monetite crystal morphology is retained, a portion of the calcium component of the FA reaction product is replaced by the alkali metal cation of the fluoride salt reactant.

If desired, the proportions of DCPD and alkali metal fluoride can be adjusted, particularly when the reaction temperature is above 40°C, to give controlled ratios of FA and ADCP, both having the crystal morphology of Brushite. Similarly, reaction proportions and temperature (preferably 90°C) using ADCP and alkali metal fluoride can be adjusted to partially form FA and thereby produce a mixture of FA and ADCP, both having the crystal morphology of Monetite.

pH FLUCTUATION TECHNIQUES

The calcium orthophosphate material may also be prepared by procedures which render them particularly useful for protecting dental enamel.

The pH of salivary fluids in the human mouth varies within wide limits, (typically between about 4.5 and about 7.5) and conditions are thereby created which promote the growth and development of crystals of HA, FHA and FA. Such crystals are chemically identical with those of human tooth enamel and their deposition and subsequent growth in the vulnerable sites on teeth (e.g. the pits and fissures) can repair the tissue and prevent or delay further carious attack.

The pH conditions which promote growth and development of apatite type crystals has led to a procedure in accordance with aspects of this invention whereby materials containing calcium and phosphate can be prepared in controlled purity by synthesis from solution.

For instance, analytically pure FA may be made from a suspension of an aqueous fluoride solution, the pH of the aqueous supernatant being repeatedly fluctuated within the limits pH 4 and pH 7. More specifically, HA which is typically prepared by neutralising orthophosphoric acid with a slurry of calcium oxide is placed in a container with which it is inert and non-active, such as a polyethylene container. Hydrofluoric acid, buffered at pH 7 with a base such as ammonium hydroxide, triethanolamine or the like, is added in about 5 percent excess of the equimolar amount. The pH is then slowly reduced to 4 by the addition of nitric acid and equilibrium established. A concentrated solution of the base is then again added to return the pH to 7. The pH is then fluctuated to 4 and back to 7, two or more additional times. A sufficient time should be allowed to elapse at each pH 4 and pH 7 level for chemical equilibrium to be established and growth of crystallites to occur. Thus, a period of about 1 hour to about 8 hours, typically about 1 hour to about 3 hours, is provided between each pH swing. The FA reaction product is filtered, washed, for instance about 2–5 times with water and then about 2–5 times with acetone, and dried. The product is analytically pure FA and is obtained in stoichiometric amount. It is a desirable dental polishing agent or abrasive and has potential remineralising properties. It also provides fluoride to dental enamel.

The foregoing pH fluctuation technique can be modified to provide other calcium and phosphate materials. FHA can be similarly prepared employing less than an equimolar amount of hydrofluoric acid for reaction with HA. For use as a dental cement or filling material, the preferred FHA reaction product has the empirical formula $Ca_{10}(OH)_{1.6}F_{0.4}(PO_4)_6$.

If in the preparations of FA or FHA, it is desired to include some alkali metal cation in the crystal lattice, hydrofluoric acid reactant can be replaced by the appropriate alkali metal fluoride, e.g. LiF, NaF, KF, RbF, or CsF. Basic buffer to adjust the initial pH of the supernatant solution to 7 would be used only if necessary when alkali metal fluoride reactant is employed.

The fluctuating pH technique for the preparation of FA and FHA can be modified by reacting calcium fluoride with a source of calcium and orthophosphate ions. Thus, this procedure for the production of fluorine-containing apatites comprises dissolving calcium fluoride in acid containing a source of calcium and orthophosphate ions, and raising the pH to about 7 by the addition of a base.

The acidified mixture preferably has a pH of about 4 or below.

A convenient source of the calcium and orthophosphate ions is a soluble calcium orthophosphate salt. Preferably the calcium orthophosphate is used in considerable excess relative to the calcium fluoride, for example, in a molar ratio of 20:1. The minimum molar ratio for the formation of a fluorapatite is 9:1.

Any suitable calcium orthophosphate may be used; for example, those having the formulae: $CaHPO_4$, $Ca_5OH(PO_4)_3$ and $CaHPO_4.2H_2O$.

Where a calcium orthophosphate is employed, the acid is preferably nitric acid.

Instead of, or in addition to, using a calcium orthophosphate, orthophosphoric acid may be used as the source of some or all of the orthophosphate ions. If orthophosphoric acid is used, an additional source of calcium ions besides the calcium fluoride is required, e.g. calcium carbonate or some other calcium salt.

The base used to raise the pH to about 7 is again preferably volatile base such as ammonia or ammonium hydroxide or triethanolamine, but non-volatile bases such as alkali metal hydroxides can be used if the substitution of alkali metal cations into the fluorapatite can be tolerated.

Instead of using only a single step, the pH may be caused to fluctuate 2-5 times, e.g. three times, between about 4 and about 7, the solution again being allowed to remain for a period of time, e.g. about one hour, at each of the upper and lower pH levels, terminating with a final pH of about 7.

On completion of the reaction the solid product can be removed from the liquid medium by conventional means, e.g. settling or filtration.

The calcium orthophosphate material may also include various ions in apatites, using pH fluctuation techniques. For instance, monofluorophosphate ions may be incorporated into apatites and thus be available for incorporation into dental enamel as remineralisation occurs. The apatites may be apatite itself or a calcium deficient apatite which may be defined empirically as $Ca_{10-y}H_y(OH)_{2-y}(PO_4)_6 \cdot nH_2O$ where $0 \le n \ge 10$ and $0 \le y \ge 2$, as well as HA, FHA, or FA. Procedures earlier described for preparing apatite materials such as by pH fluctuation or by providing precursor morphology may be used to obtain the apatite materials.

The calcium phosphate materials containing monofluorophosphate ions are prepared from the corresponding apatite material by repeatedly (say two to five times) fluctuating the pH of an aqueous solution of a monofluorophosphate containing a suspension of the apatite material, between a pH of about 4 and a pH of about 7, and separating the resulting solid product from the supernatant liquid. For example, sodium monofluorophosphate is dissolved in an aqueous suspension of apatite and the pH is lowered to about 4 by adding a mineral acid such as nitric acid. After a period of time (e.g. 1 hour) at this pH, a base is added to raise the pH gradually to about 7. Preferably the base is a volatile base, such as ammonium hydroxide, but other bases such as alkali metal hydroxides may be used. After a period of time (e.g. 2 hours) the suspension is re-acidified and the cycle is separated several times, e.g. three times. The resulting apatite into which monofluorophosphate ions have been incorporated, possibly in partial replacement of orthophosphate, is separated from the supernatant liquid by any suitable means, e.g. by settling or filtration.

Carbonate or bicarbonate ions may also be incorporated into HA employing the pH fluctuation technique to provide a material which has physical properties which resemble talc. This compound may be prepared in various ways. In a preferred method, pH fluctuation as earlier described is employed. An aqueous suspension of hydroxyapatite is acidified to a pH of about 4 and equilibrium established. The pH is then raised to about 7 by the addition of a neutral or basic material providing carbonate ions, such as an alkali metal carbonate or bicarbonate, e.g. sodium carbonate or sodium bicarbonate, preferably the latter. After equilibrium is reached, the suspension is then reacidified by adding acid, and re-neutralized. The cycle may be repeated several times, say 2-5 times.

Desirable aspects also include partial displacement of calcium from apatite materials such as HA, FA and FHA, which may be provided by procedures earlier disclosed, by other divalent metals including alkaline earth metals such as magnesium, strontium and barium and transition metals such as zinc, copper, cadmium, nickel, cobalt, iron, manganese and chromium using pH fluctuation techniques. These divalent metal ions are introduced in amounts such that they are non-toxic in use. Typically they displace about 0.1 - 1 cation percent of the calcium.

Zinc-substituted apatites such as zinc-substituted HA, FA and FHA can be made by reacting a zinc salt with the appropriate apatite compound under conditions of fluctuating pH similar to the techniques earlier described above as for the preparation of FA and FHA. For example, hydroxy-apatite may be placed in a container and an aqueous solution of up to $10^{-2}M$ zinc nitrate added thereto. The pH is caused to fluctuate between about 7 and about 4 several times, e.g. three times, equilibrium being achieved between each swing. After filtration and washing with water and with an organic solvent such as an acetone, the resulting solid is dried. The concentration of the zinc in the solution controls the degree of substitution of the zinc in the hydroxy-apatite.

A similar technique can be used for preparing zinc-substituted FHA from HA, in which the HA is reacted first with a solution of hydrogen fluoride or a soluble salt of the acid, and then with zinc nitrate solution, both under fluctuating pH conditions. Alternatively, after zinc-substituted HA is made, zinc-substituted FHA can be prepared by reaction with hydrogen fluoride or a soluble salt of the acid under fluctuating pH conditions.

Buffering to the higher pH value (about 7) may be achieved by the use of a base such as ammonium hydroxide or triethanolamine.

Similar techniques to those described above may be used for the substitution of other divalent ions instead of zinc.

In a modification of the foregoing reaction, when HA is treated simultaneously with the non-toxic divalent metal ion other than calcium (such as zinc) and a fluoride ion, at the same time under the fluctuating pH conditions, a different end product than divalent metal ion-substituted FHA is obtained.

The mechanism is believed to be that instead of the separate replacements of $M^{2+}$ for $Ca^{2+}$ and $F^-$ for $OH^-$, the two ions enter the crystal lattice of apatite as a complex fluoroanion such as $MF_4^{2-}$ or $MF_6^{4-}$, or as a mixture of both. Such anions replace the orthophosphate groups in apatite.

In a typical example, a slurry of apatite in water is treated with a solution containing $F^-$ ions and $ZN^{2+}$ ions at concentrations of $10^{-2}M$ and $10^{-3}M$ respectively. The pH of the supernatant liquid is then fluctuated over the pH range 7 to 4 to 7 several times, typically three or four times, by the appropriate additions of nitric acid, and of ammonia or ammonium hydroxide, allowing, say, one hour between each pH adjustment for the establishment of chemical equilibrium. More orthophosphate is released during this reaction than from a control where no added divalent cation is present, thus indicating that some other anion has been incorporated into the apatite. On completion of the reaction, generally at the higher pH level, the solid product can be removed from the liquid medium by conventional means, e.g. settling or filtration.

The principal evidence which leads to the belief that substitution of a complex fluoroanion may occur under conditions of fluctuating pH is that the hydroxyl stretching band in the infra-red of these substituted hydroxy apatites is not diminished unless excess $F^-$ ions are present over and above that required to produce $MF_4^{2-}$ or $MF_6^{4-}$. Fluoride analysis of the solid showed that expected uptake of fluoride had occurred.

If excess $F^-$ is used over and above that required to produce $MF_4^{2-}$ or $MF_6^{4-}$, the hydroxyl band in the infra-red near $3,600$ cm$^{-1}$ is diminished and split, indicating that direct substitution of $F^-$ for $OH^-$ also occurs.

Divalent metal ions other than calcium may also be incorporated into other apatites such as FA and FHA by the described pH fluctuation techniques.

Additional calcium orthophosphate materials include DCPD and ADCP into which are incorporated alkaline earth metal ions (other than calcium) and transition metal ions including for example, zinc, copper, cadmium, nickel, cobalt, iron, manganese and chromium.

The divalent metal ion typically displaces about 0.1–5 cation percent of calcium, and as such is provided in non-toxic amount into the calcium and phosphate material.

Zinc-substituted DCPD can be prepared by reacting an aqueous slurry containing a mixture of calcium oxide and zinc oxide or a mixture of calcium carbonate and zinc carbonate with orthophosphoric acid.

Alternatively, zinc-substituted DCPD can be made by reacting an aqueous solution of a mixture of calcium and zinc halides, for example, calcium chloride and zinc chloride, or an aqueous solution of a mixture of calcium nitrate and zinc nitrate, with an aqueous solution of a mixture of monobasic and dibasic sodium orthophosphates, the pH during reaction being no higher than about 5 and preferably in the range from about 4 to about 5. The temperature of the reaction mixture should not rise above 30°C, and preferably be no higher than 20°C.

Divalent metal ions other than zinc may similarly displace calcium in DCPD and ADCP by employing compounds of the appropriate metal instead of the zinc compound.

The calcium phosphate material typically constitutes about 10 – 75 percent by weight, preferably about 40 – 70 percent most preferably about 44 – 62 percent, of the dental cement or filling material.

The calcium orthophosphate materials are believed to influence remineralisation of the underlying tooth structure by some form of crystal growth across the interface. Adhesion of the dental material to the tooth structure is thus enhanced.

Mixtures of the fluorine-containing compounds and the calcium orthophosphate materials can produce advantageous effects on the underlying tooth structure.

The fluorine-containing compound and calcium orthophosphate material are prepared in a powder mixture with zinc oxide, which is preferably sintered for instance by heating to form analar zinc oxide. Zinc oxide typically comprises the remainder of the powder, generally about 5–89.5 percent by weight, preferably about 20–40 percent and most preferably about 24–38 percent.

Additional components such as dyes to conform the colour of the material to dental enamel may be present in the powder in minor amounts.

The dental powder mixture is mixed to form a paste of appropriate consistency at the time of use as a cement lining or cavity filler with orthophosphoric acid and/or polyacrylic acid as paste-forming agent. The paste-forming agent is dissolved in at least about 20 percent, typically up to about 60 percent solution in water and is mixed with the powder to form the paste of desired consistency, the ratio of powder to paste generally being about 0.5:1 to 4:1 by weight, preferably about 2:1 to about 3:1. The molecular weight of polyacrylic acid is generally up to about 500,000 and may be as low as 5,000. Usually, it is in the range from 40,000 to 275,000.

The proportions in which the various component may be incorporated in the dental cement of filling materials may vary widely as indicated in the illustrative examples. They should be employed in appropriate amounts which do not adversely affect the physical properties of the dental material.

The following Examples of cement and filling powders illustrate the invention. The amounts given are in parts by weight.

EXAMPLE

| Ingredient | 1 | 2 | 3 | 4 | 5 | 6 | 7 | 8 | 9 | 10 | 11 |
|---|---|---|---|---|---|---|---|---|---|---|---|
| Zinc oxide | 2 | 2 | 2 | 2 | 1 | 1 | 1 | 1 | 1 | 2 | 2 |
| Dicalcium phosphate dihydrate (11) | 5 | 2 | — | — | — | — | — | — | — | 5 | — |
| Anhydrous dicalcium phosphate (12) | — | — | 5 | — | — | — | — | — | — | — | 5 |
| Fluoro-apatite (2) | — | — | — | 2 | 2 | — | 2 | — | — | — | — |
| Fluorohydroxy-apatite (7) | — | — | — | — | — | 1 | — | 2 | — | — | — |
| Hydroxy-apatite (6) | — | — | — | — | — | — | — | — | 2 | — | — |
| Sodium monofluorophosphate | 0.2 | 0.2 | 0.1 | 0.35 | 0.4 | 0.4 | 0.5 | 0.5 | 0.5 | 0.5 | 0.5 |
| Sodium fluoride | 1 | 0.4 | 1 | 0.15 | 0.1 | 0.4 | — | — | — | 1 | 1 |

At the time of use the above powders are mixed to pasty consistency with 25 percent aqueous solutions of orthophosphoric acid and of polyacrylic acid ((M.W. = 80,000).

What I claim as my invention and desire to secure by Letters Patent is:

1. A dental cement and filling powder comprising zinc oxide, a fluorine-containing compound which dissolves or dissociates to yield fluoride ions and a calcium orthophosphate material selected from the group consisting of:
   1. analytically pure fluorapatite (FA);
   2. FA having the crystal morphology of Brushite;
   3. FA having the crystal morphology of Monetite;
   4. Hydroxyapatite (HA) having monofluorophosphate ions incorporated in the crystal lattice thereof;
   5. HA having carbonate or bicarbonate ions incorporated in the crystal lattice thereof;

6. HA having a complex fluoro anion of a transition metal incorporated in the crystal lattice thereof;
7. Fluorohydroxyapatite (FHA);
8. FA wherein a portion of the calcium ion thereof is replaced by another divalent cation selected from the group consisting of alkaline earth metal cation and transition metal cation;
9. FHA wherein a portion of the calcium ion content thereof is replaced by another divalent cation selected from the group consisting of alkaline earth metal cation and transition metal cation;
10. HA wherein a portion of the calcium ion content thereof is replaced by another divalent cation selected from the group consisting of alkaline earth metal cation and transition metal cation
11. DCPD wherein a portion of the calcium ion content thereof is replaced by another divalent cation selected from the group consisting of alkaline earth metal cation and transition metal cation;
12. ADCP wherein a portion of the calcium ion content is replaced by another divalent cation selected from the group consisting of alkaline earth metal cation and transition metal cation.

2. The dental cement and filling powder claimed in claim 1 comprising about 5 – 89.5 percent by weight of said zinc oxide about 0.5 – 20 percent by weight of said fluoride-containing compound and about 10 – 75 percent by weight of said calcium phosphate material.

3. The dental cement and filling powder claimed in claim 2 wherein said fluorine-containing material is selected from the group consisting of sodium monofluorophosphate, sodium fluoride and mixture thereof.

* * * * *